(12) United States Patent
Qu et al.

(10) Patent No.: US 10,246,628 B2
(45) Date of Patent: Apr. 2, 2019

(54) MULTIPLE HYDROPHILIC HEAD CORROSION INHIBITORS

(71) Applicant: Multi-Chem Group, LLC, San Angelo, TX (US)

(72) Inventors: Liangwei Qu, Spring, TX (US); Nathan Darrell Davis, Conroe, TX (US); Funian Zhao, Tomball, TX (US); Qiang Fu, Houston, TX (US)

(73) Assignee: MULTI-CHEM GROUP, LLC, Houston, TX (US)

( * ) Notice: Subject to any disclaimer, the term of this patent is extended or adjusted under 35 U.S.C. 154(b) by 0 days.

(21) Appl. No.: 15/465,787

(22) Filed: Mar. 22, 2017

(65) Prior Publication Data

US 2017/0190952 A1 Jul. 6, 2017

Related U.S. Application Data

(62) Division of application No. 15/025,475, filed as application No. PCT/US2014/036745 on May 5, 2014, now Pat. No. 9,637,679.

(51) Int. Cl.
*C09K 8/54* (2006.01)
*C23F 11/04* (2006.01)
(Continued)

(52) U.S. Cl.
CPC ............ *C09K 8/54* (2013.01); *C09K 8/035* (2013.01); *C09K 8/40* (2013.01); *C23F 11/141* (2013.01);
(Continued)

(58) Field of Classification Search
None
See application file for complete search history.

(56) References Cited

U.S. PATENT DOCUMENTS 4,812,263 A 3/1989 Login
2006/0013798 A1* 1/2006 Henry .................. A61K 31/785
424/78.09
(Continued)

FOREIGN PATENT DOCUMENTS

WO 2012/063055 A1 5/2012

OTHER PUBLICATIONS

International Search Report and Written Opinion issued in related Application No. PCT/US2014/036745, dated Jan. 28, 2015 (15 pages).

(Continued)

*Primary Examiner* — Jeffrey D Washville
(74) *Attorney, Agent, or Firm* — Tenley Krueger; Baker Botts L.L.P.

(57) ABSTRACT

Compounds comprising multiple hydrophilic heads and a lipophilic tail may be contacted with a metal or other surface so as to adhere to the surface and inhibit corrosion, among other things. Suitable hydrophilic heads may include quaternary ammonium cation moieties, phosphonium cation moieties, and combinations thereof. Such corrosion-inhibiting compounds may be introduced into a wellbore penetrating at least a portion of a subterranean formation, for instance in oil and/or gas recovery operations and the like, whereupon the compound may adhere to a metal or other surface downhole so as to inhibit corrosion of the surface. These compounds may be employed in various other environments, such as any metal or other surface that may be exposed to corrosive conditions.

9 Claims, 7 Drawing Sheets

(51) Int. Cl.
  *F16L 58/04* (2006.01)
  *C09K 8/035* (2006.01)
  *C09K 8/40* (2006.01)
  *C23F 11/14* (2006.01)
  *C23F 11/167* (2006.01)

(52) U.S. Cl.
  CPC .......... *C23F 11/142* (2013.01); *C23F 11/146* (2013.01); *C23F 11/167* (2013.01); *F16L 58/04* (2013.01); *C09K 2208/32* (2013.01)

(56) References Cited

U.S. PATENT DOCUMENTS

| | | |
|---|---|---|
| 2006/0062753 A1 | 3/2006 | Naraghi et al. |
| 2007/0111896 A1 | 5/2007 | Knox et al. |
| 2007/0173414 A1 | 7/2007 | Wilson, Jr. |
| 2010/0008461 A1 | 4/2010 | Acosta et al. |
| 2011/0190530 A1 | 8/2011 | Knox |

OTHER PUBLICATIONS

International Preliminary Report on Patentability issued in related Application No. PCT/US2014/036745, dated Nov. 17, 2016 (11 pages).

Huskens, J., 2006. Mulivalent interactions at interfaces. Current opinion in chemical biology, 10(6), pp. 537-543.

* cited by examiner

MULTIPLE HYDROPHILIC HEAD CORROSION INHIBITORS

CROSS-REFERENCE TO RELATED APPLICATIONS

This application claims priority to and is a divisional application of U.S. application Ser. No. 15/025,475 filed on Mar. 28, 2016 entitled "Multiple Hydrophilic Head Corrosion Inhibitors," which is a U.S. National Stage Application of International Application No. PCT/US2014/036745 filed May 5, 2014, the entire disclosures of which are incorporated by reference.

BACKGROUND

The present disclosure relates generally to compounds and methods for providing corrosion inhibition in subterranean operations, pipelines, and other related operations.

Corrosion of metal surfaces may occur when the metal surfaces are contacted by a corrosive environment. Such contact could include corrosive fluids or other compounds such as oxidizers (e.g., electrochemical oxidizer, a chemical oxidizer, or the like). Similarly, acidic conditions, contact with compounds containing water vapor in the presence of air and/or oxygen, and contact with compounds containing halides or halide ions (e.g., bromide or chloride ions) may result in corrosion of a metal surface. As used herein, the term "corrosion" refers to any reaction or interaction between a metal and its environment that causes some deterioration of the metal or its properties. Examples of common types of corrosion include, but are not limited to, the rusting of a metal, the dissolution of a metal in acids, and patina development on the surface of a metal.

Metal and other surfaces in subterranean operations—such as downhole tubing and equipment, subsea or surface pipelines, pressure vessels, storage tanks, and the like—frequently come into contact with corrosive environments. To combat potential corrosion problems, various corrosion inhibitors have been used to reduce or substantially prevent corrosion of metal and metal alloy surfaces on downhole equipment, with varying levels of success. As used herein, the term "inhibit" and its derivatives refer to a lessening of the tendency of a phenomenon to occur and/or the degree to which that phenomenon occurs. The term "inhibit" does not imply any particular degree or amount of inhibition.

Figure 1:
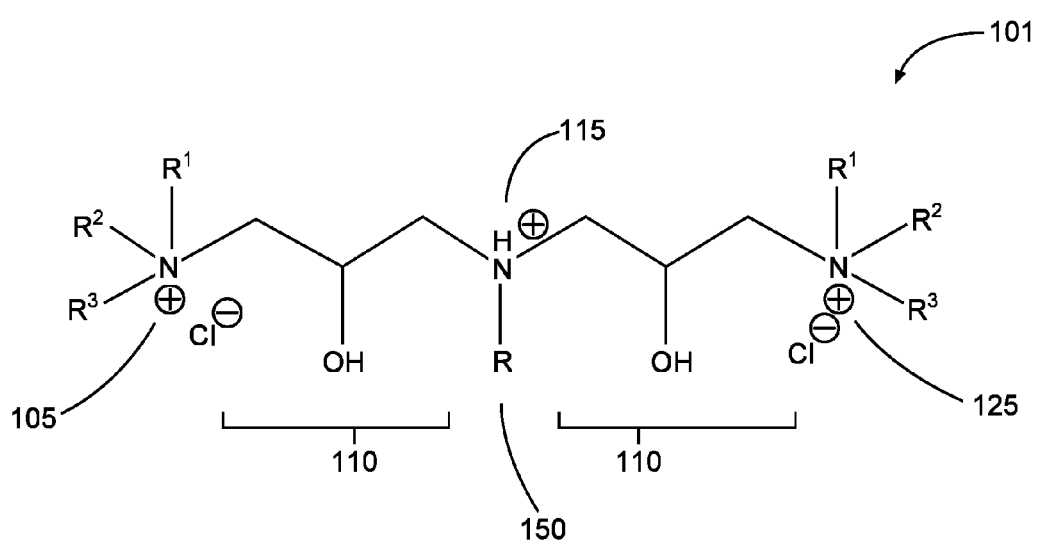
FIG. 1 is a diagram illustrating a compound that includes multiple quaternary cation moieties in accordance with aspects of the present disclosure.

While embodiments of this disclosure have been depicted and described and are defined by reference to exemplary embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells, monitoring wells, and production wells, including hydrocarbon or geothermal wells.

Corrosion inhibitors may include surface-active compounds that may form protective films on the surface of a metal that comes in contact with a corrosive environment, thereby suppressing corrosion. The effectiveness of such a film-forming corrosion inhibitor (FFCI) may be partly determined by the strength of the FFCI's adsorption or other adherence to the metal surface (or to another surface such as a ferrous scale surface like siderite, iron carbonate). Such adsorption may, inter alia, form a protective layer that physically, chemically, or otherwise prevents corrosive compounds from reaching the metal or other surface to which the inhibitor has adhered.

The present disclosure relates generally to compounds and methods for providing corrosion inhibition in subterranean operations, pipelines, and other related operations.

In some embodiments, the present disclosure may provide a corrosion-inhibiting compound comprising multiple hydrophilic heads and at least one hydrophobic tail (which may alternatively be referred to as a lipophilic tail). The compound according to certain embodiments may include exactly one hydrophobic tail. In certain other embodiments, the compound may include hydrophilic heads and tails in a ratio of 2 or more hydrophilic heads for every 1 lipophilic tail. The ratio of particular embodiments may be 3 hydrophilic heads to 1 lipophilic tail. Any two or more of the multiple hydrophilic heads may be bonded via one or more linking groups. In some aspects, the present disclosure may also or instead provide salts of such compounds. The present disclosure further provides methods of using such compounds and/or salts thereof. For example, some embodiments provide a method of inhibiting corrosion on a surface. Such a method could include contacting the surface with a compound according to the present disclosure, and/or salts thereof. The surface in some embodiments may be a downhole metal surface used in a subterranean operation.

Among the many advantages provided herein, compounds and methods of using compounds according to the present disclosure may provide enhanced corrosion inhibition properties. For example, in embodiments involving inhibiting corrosion on a surface: compounds of the present disclosure may provide greater interaction between such compounds and a surface, thereby providing superior corrosion inhibition properties. Such compounds may also or instead provide a more protective barrier as compared to conventional corrosion inhibitors.

In the corrosion-inhibiting compounds according to some embodiments, any one or more of the multiple hydrophilic heads of such embodiments may each comprise a cation moiety. Any one or more of the multiple heads may each comprise a quaternary cation moiety (e.g., a quaternary ammonium or quaternary phosphonium cation moiety). In particular embodiments, each of two or more of the multiple heads may comprise a quaternary cation moiety, such that the compound comprises two or more quaternary cation moieties. A quaternary cation moiety may be referred to herein as a "quat moiety" or alternatively as a "quat." A compound comprising two or more quats may be referred to herein alternatively as a "multiple quat," a "multi-quat," or a "multiple quaternary compound." A quat moiety located on an end-point of a compound according to some embodiments may be of the general structure $R^1R^2R^3M^+$-, where each R-group $R^1$, $R^2$, and $R^3$ may be any suitable moiety that maintains the hydrophilic nature of the quat moiety to which each of $R^1$, $R^2$, and $R^3$ is attached, and M may be nitrogen or phosphorus. For instance, the example embodiment shown in FIG. 1 includes two quat moieties 105 and 125 (shown in FIG. 1 where M is nitrogen) located at end-points of the molecule 101—that is, each quat moiety is bonded at only one location to the remainder of the compound. In some embodiments, a quat moiety may be included in the middle of a compound. In such embodiments, a quat moiety may have the general structure —$R^1R^2M^+$-, and the remaining moieties of the compound are bonded at each of two locations to this general structure.

In various embodiments, each R-group may be either the same or different with respect to the others. In some embodiments, each of $R^1$ and $R^2$ (and $R^3$, where present) may comprise an organic moiety such as any one or more of: alkyl, alkenyl, alkynyl, aryl, arylalkyl, arylalkenyl, alkylaryl, alkenylaryl, glycol, and combinations thereof. Each of $R^1$, $R^2$, and $R^3$ may be branched or normal. Each of $R^1$, $R^2$, and $R^3$ may be different, although any two or more of these R groups may be the same. Each of these R-groups may comprise approximately 1 to 20 carbon atoms. That is, each R-group may be a $C_1$ to $C_{20}$ hydrocarbon chain (excepting embodiments wherein the R-group comprises an alkenyl or alkynyl group, in which case at least 2 carbon atoms are necessary). In particular embodiments, each R-group may be a $C_1$ to $C_{12}$ hydrocarbon chain. As used herein, a "hydrocarbon chain" may, unless otherwise specifically noted, be substituted or unsubstituted (that is, it may or may not contain one or more additional moieties or functional groups in place of one or more hydrogens in the hydrocarbon chain); it may be branched, unbranched, cyclic, and/or acyclic; and/or it may be saturated or unsaturated. Furthermore, as used herein, the nomenclature "$C_x$ to $C_y$" refers to the number of carbon atoms in the hydrocarbon chain (here, ranging from x to y carbon atoms).

An R-group hydrocarbon chain according to various embodiments may be either substituted or unsubstituted, and/or branched or unbranched, and/or cyclic or non-cyclic, and/or saturated or unsaturated. Thus, an R-group of some embodiments may comprise a $C_1$ to $C_{10}$ alkyl chain (branched or unbranched), or in other embodiments a $C_2$ to $C_6$ alkyl, alkenyl, or alkynyl chain (branched or unbranched), or in yet other embodiments a $C_2$ to $C_8$ alkyl, alkenyl, or alkynyl chain (branched or unbranched). Similarly, an R-group may comprise a $C_3$ to $C_{10}$ aryl moiety (and likewise for $C_3$ to $C_6$ moieties). Some embodiments may include R-groups of variously sized hydrocarbon chains, such as a hydrocarbon chain having as few as any one of: 1, 2, 3, 4, 5, 6, 7, 8, 9, and 10 carbon atoms; and as many as any one of: 2, 3, 4, 5, 6, 7, 8, 9, 10, 11, 12, 13, 14, 15, 16, 17, 18, 19, and 20 carbon atoms. As noted, an R-group according to some embodiments may include other groups in addition to the hydrocarbon groups described above (e.g., it may include a substituted hydrocarbon chain), so long as the quat moiety remains hydrophilic. An R-group of any quat moiety of a compound according to some embodiments may be smaller than the lipophilic tail of such compound.

As noted, some compounds according to the present disclosure may include multiple quats. In such instances, any two or more quat moieties may be isomeric and/or stereoisomeric with respect to each other (that is, each of two or more quats may be of the general structure $R^1R^2R^3M^+$- with each R-group as described above, or each of two or more quats may be of the general structure —$R^1R^2M^+$- when incorporated into the middle of the compound). In some embodiments, any one or more quat moieties may include a different set of R-groups (e.g., a set of R-groups whose identities are only partially overlapping or entirely non-overlapping with respect to the identities of R-groups of another quat moiety). Thus, taking for example the case with entirely non-overlapping R-groups, some embodiments may comprise a first quat moiety having general structure $R^1R^2R^3M^+$- and a second quat moiety having general structure $R^4R^5R^6M^+$-, where each of $R^4$, $R^5$, and $R^6$ may have a general structure according to the principles discussed above with respect to R-groups $R^1$, $R^2$, and $R^3$.

Other suitable hydrophilic heads according to some embodiments may include any one or more of: tertiary ammonium or phosphonium cation moieties (e.g., ammonium cation moieties and/or phosphonium cation moieties of the general structures discussed above wherein one R-group is hydrogen); secondary ammonium or phosphonium cation moieties (likewise, wherein each of two R-groups are hydrogen); and/or primary ammonium or phosphonium cation moieties ($H_3N^+$— or $H_3P^+$–). In certain embodiments, a hydrophilic head need not necessarily be a cation moiety. For instance, an amine or phosphine moiety of some compounds according to various embodiments may constitute a hydrophilic head. In some embodiments, whether an amine or phosphine may be a hydrophilic head may depend at least in part upon the groups appended thereto. In some embodiments, a hydrophilic head of a corrosion-inhibiting compound may include any moiety that tends to be attracted to water and other polar substances.

Any two or more of the multiple hydrophilic heads may be joined (e.g., bonded or otherwise coupled) indirectly by a linking group. A linking group may be any moiety suitable for linking two hydrophilic heads. For example, FIG. 1 shows example linking groups 110, each of which is a hydroxypropyl moiety linking, respectively, hydrophilic heads 105 and 115, and hydrophilic heads 125 and 115. Other linking groups may be suitable, such as any hydrocarbon chain. In particular embodiments, the hydrocarbon chain may be substituted, for instance with a functional group comprising any one or more of: ether, ester, carboxylate, sulfonate, sulfonic ester, carboxyl ester, hydroxyl, alkane, alkene, alkyne, and combinations thereof. In some embodiments, the substituted group may comprise a long or short-chain polymer (e.g., polyethylene oxide (PEO), and/or polypropylene oxide (PPO)). In some embodiments, the linking group may be of a length that both (i) maintains the hydrophilic nature of each hydrophilic head and (ii) provides adequate spacing between hydrophilic heads such that each head may distinctly interact with a metal surface independently of any other hydrophilic head.

As previously noted, a compound according to some embodiments may further include a lipophilic tail (sometimes alternatively referred to as a hydrophobic tail), such as tail 150 shown in the example compound of FIG. 1, denoted therein as R. In certain embodiments, a compound may include exactly one lipophilic tail R. A lipophilic tail R may be bonded directly to a hydrophilic head moiety. The example compound of FIG. 1 shows a lipophilic tail 150 directly bonded to a hydrophilic head 115, shown in FIG. 1 as a tertiary ammonium ion. The tail may be of sufficient length and composition to retain lipophilic and/or hydrophobic properties. By way of example, the tail R of some embodiments may comprise a $C_3$ to $C_{50}$ hydrocarbon chain. A corrosion-inhibiting compound according to particular embodiments may include multiple lipophilic tails. In certain of these embodiments, the corrosion-inhibiting compound may additionally include two or more hydrophilic heads for each lipophilic tail.

The $C_3$ to $C_{50}$ hydrocarbon chain may be substituted or unsubstituted (that is, it may or may not contain an additional moiety or functional group in place of one or more hydrogens on the hydrocarbon chain), branched or unbranched. It may comprise any one or more of alkyl, alkenyl, alkynyl, and aryl groups, and/or combinations thereof. The chain may further optionally be substituted with any one or more additional groups, so long as such substituted additional group or groups do not alter the lipophilic and/or hydrophobic nature of the tail. In particular embodiments, the tail may comprise (i) as few as any one of: 3, 4, 5, 6, 7, 8, 9, 10, 11, 12, 13, 14, 15, 16, 17, 18, 19, and 20 carbons, and (ii) as many as any one of: 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, and 50 carbons. For example, suitable ranges of carbon atoms in the tail according to various embodiments include: 3 to 5, 4 to 8, 5 to 15, 8 to 18, 8 to 20, 10 to 20, 15 to 20, 18 to 30, 18 to 50, etc. In particular embodiments, the lipophilic tail R may include more carbon atoms than any one of the R-groups of each of the multiple hydrophilic heads. In embodiments wherein the lipophilic tail R includes a hydrocarbon chain longer than $C_{18}$, the lipophilic tail may further include a functional group that increases the relative hydrophilicity of the lipophilic tail. This may, among other things, aid in dispersibility of the corrosion-inhibiting compound in water or other aqueous environments, which may aid in delivery of the corrosion-inhibiting compound to a surface desired to be protected by the compound. For example, in such embodiments, the lipophilic tail may include one or more of an alkene, ethoxylate, carboxyl, hydroxyl, and combinations thereof.

Compounds according to some embodiments may instead or in addition be characterized as reaction products. For example, the present disclosure in some embodiments provides a compound that may be characterized as the reaction product of: (1) the reaction product of a long-chain primary amine and an epihalohydrin; and (2) a tertiary amine. Put another way, compounds of such embodiments may be characterized as the product of a two-step reaction: (1) R—$NH_2$+2[epihalohydrin]; and (2) [product of reaction (1)]+$R^1R^2R^3N$. Each reaction step may be carried out at approximately room temperature (e.g., about 20° C. to about 25° C.). In some embodiments, each reaction step may be carried out at any temperature ranging from about 20 to about 80° C. at approximately atmospheric pressure. The epihalohydrin may comprise epichlorohydrin, epibromohydrin, epifluorohydrin, epiiodohydrin, and combinations thereof.

In this scheme, the resultant product may include organic moiety R of the long-chain primary amine as lipophilic tail R; thus, the possible identities of organic moiety R may be the same as previously discussed with respect to lipophilic tail R (notwithstanding the moniker "long-chain," which is not intended to imply that a particular structure of R is required in any embodiment, other than as discussed previously with respect to lipophilic tail R as seen in various embodiments). Specific examples of suitable long-chain primary amine include cocoamine, tallow amine, oleyl amine, stearyl amine, lauryl amine, and combinations of the foregoing, as well as other long-chain primary amines having organic moiety R with characteristics in accordance with the lipophilic tail R discussed above (and combinations thereof and/or with any of the foregoing). Similarly, R-groups $R^1$, $R^2$, and $R^3$ of the tertiary amine may be in accordance with those R-groups previously discussed with respect to quaternary ammonium cations. In yet further embodiments, however, a secondary amine may be used instead of or in addition to tertiary amine in the second reaction step. In such instances, one of R-groups $R^1$, $R^2$, and $R^3$ is H, and the resultant product may still include multiple quaternary ammonium cations, although it may instead include multiple tertiary ammonium cations, and/or a mixture of tertiary and quaternary ammonium cations. Specific examples of suitable secondary and/or tertiary amine $R^1R^2R^3N$ for use in the second step of reaction may therefore include dimethylcocoamine, triethylamine, tripropylamine, tributylamine, tripentylamine, N,N-dimethyl aniline, N,N-diethyl aniline, dimethylisopropaneamine, dimethylbutylamine, dipropylamine, and combinations thereof. The ultimate reaction product may accordingly include multiple quat moieties (and/or tertiary ammonium cation moieties to the extent secondary amines are used in reaction), each having general structure $R^1R^2R^3N$— (where each of $R^1$, $R^2$, and $R^3$ may be an R-group in accordance with those discussed previously, and/or one of $R^1$, $R^2$, and $R^3$ may be H).

Particular embodiments may provide the reaction product of a synthesis method according to the foregoing, except using (i) a long-tail primary phosphine in place of the long-tail primary amine, and (ii) a secondary or tertiary phosphine in place of the secondary or tertiary amine. And in yet other embodiments, a combination of long-tail primary phosphine and long-tail primary amine may be used in the first reaction step, and a combination of (i) secondary or tertiary phosphine and (ii) secondary or tertiary amine may be used in the second reaction step.

Figure 2:
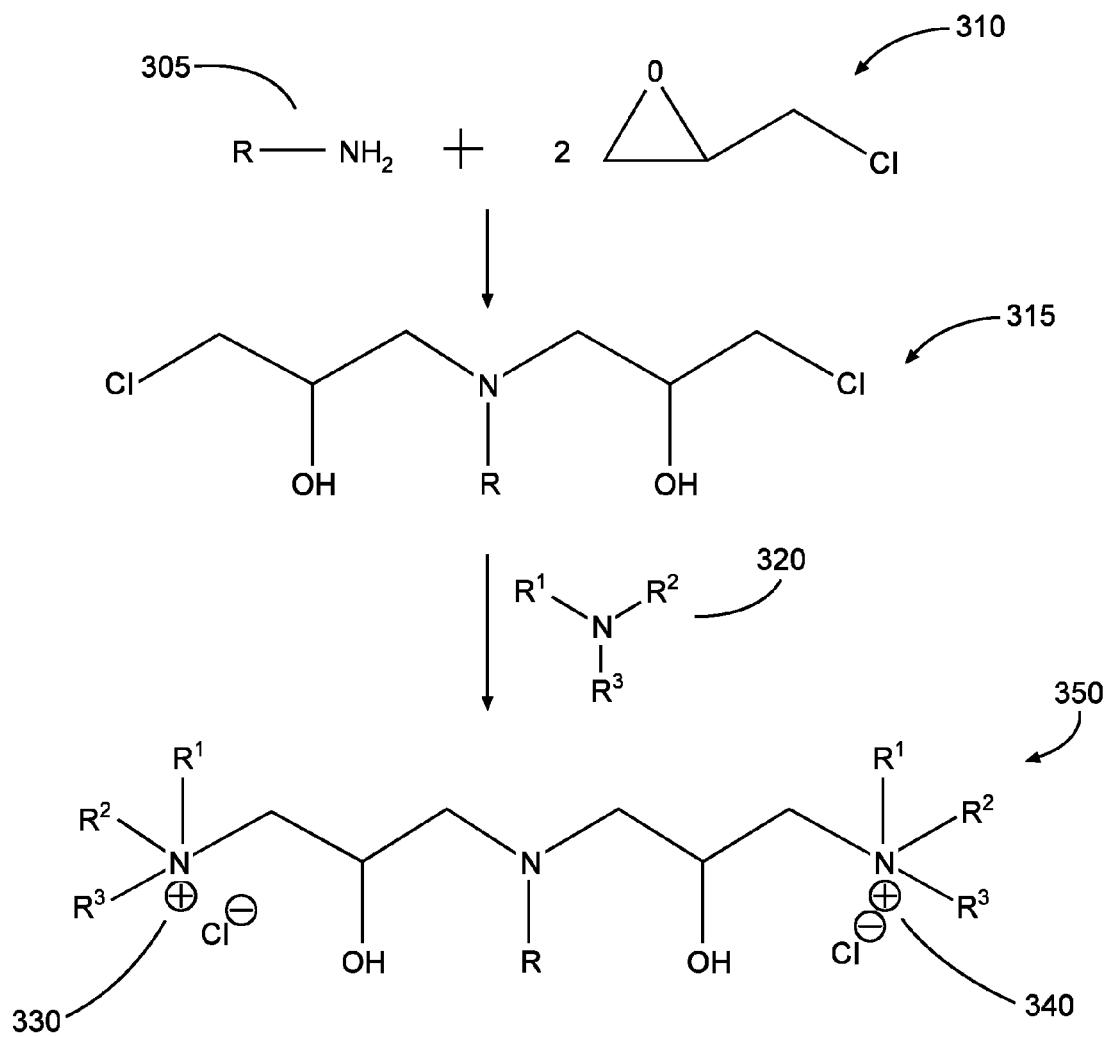
FIG. 2 is a diagram illustrating a reaction process in accordance with aspects of the present disclosure.

Thus, an example reaction product 350 may result from the synthesis steps shown in FIG. 2, in accordance with the immediately preceding discussion. As shown in the example process of FIG. 2, 1 mole of primary amine 305 reacts with 2 moles epihalohydrin 310 (shown in FIG. 2 as epichlorohydrin). The product 315 of this reaction is then in turn reacted with tertiary amine 320 (as noted previously, this could be replaced by any of: secondary amine, secondary phosphine, tertiary amine, tertiary phosphine, and combinations thereof), yielding a compound 350 comprising multiple hydrophilic heads (330, 340) according to the present disclosure. As shown in FIG. 2, the cation moieties 330 and 340 of the compound 350 are each associated (e.g., ionically bonded or otherwise associated) with chloride ions, making the compound 350 a quaternary ammonium salt. Such salts may wholly or partially dissociate in aqueous or oligeous solution and/or solvents, and/or such salts may associate with different anions. It will further be appreciated by one of ordinary skill in the art with the benefit of this disclosure that salts may initially be formed with other anions instead of or in addition to chloride anions.

For instance, suitable anions may comprise any one or more of hydroxide, carboxylate, halide, sulphate, organic sulfonate, and combinations thereof. Accordingly, when a compound comprising cation moieties is referred to herein, it should be understood that such reference may alternately include both the salt form and the dissociated form (that is, having at least one cation moiety not associated with an anion) of the compound, unless specifically noted otherwise.

Figure 3:
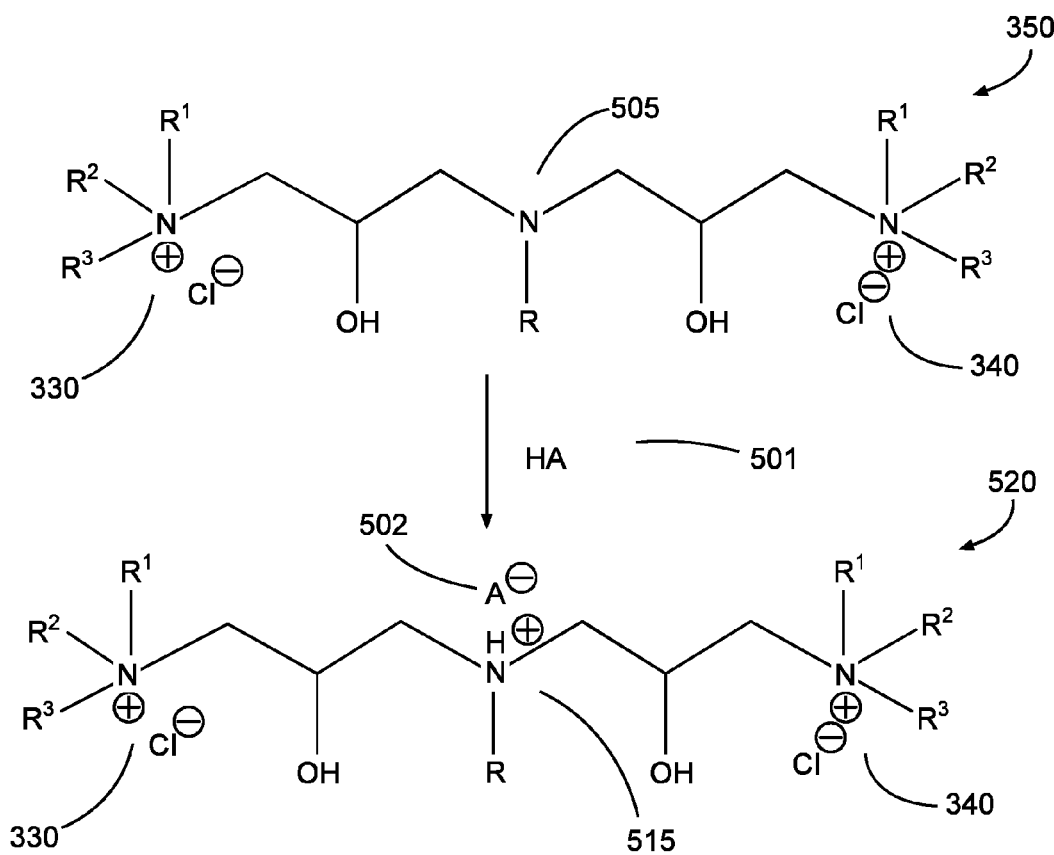
FIG. 3 is a diagram illustrating an acidization reaction process in accordance with aspects of the present disclosure.

Furthermore, a compound and/or its salt may further react with acids, including acetic acid, acrylic acid, hydrochloric acid, or any other suitable acid. Such further reaction may in some embodiments create an additional cationic hydrophilic head in the compound. Returning to the example embodiment shown by the reaction process of FIG. 2, the compound 350 (shown in FIG. 3 as being associated with two chloride ions, although such ions need not necessarily be present) may be reacted as shown in FIG. 3 with acid 501, resulting in protonation of the central amine 505 of 350, thereby creating additional cationic hydrophilic head 515. The resultant product 520 is also in accordance with other compounds described herein, and may exist in some embodiments as a salt with the conjugate base 502 of the acid 501 and chloride (and or other) anions. Of course, it will be appreciated by one of ordinary skill in the art that a compound need not necessarily form a salt; thus the compound 350 could exist in some embodiments without associated chloride or other anions (including with or without a conjugate base 502 of an acid).

In certain embodiments, a multiple hydrophilic head compound may include or be: an aminoammonium compound (and/or a salt thereof), a phosphinophosphonium compound; an aminophosphonium compound; a phosphinoammonium compound; a multi-ammonium compound (e.g., a compound having 2 or more ammonium moieties); and/or a multi-phosphonium compound (e.g., a compound having 2 or more phosphonium moieties). For example, some embodiments may include a compound having the following structural formula:

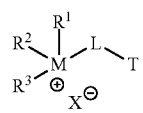

wherein each of $R^1$, $R^2$, and $R^3$ may be H or any hydrocarbon chain in accordance with discussion of R-groups $R^1$, $R^2$, and $R^3$ above; M may be nitrogen or phosphorus; X may be any anion (e.g., halide, a carboxylate, a sulfate, organic sulfonate, hydroxide, and/or combinations thereof); L may be a suitable linking group (e.g., a $C_1$ to $C_{20}$ hydrocarbon chain); and T may be an amine, ammonium, phosphine, or phosphonium. Moreover, in particular embodiments, only one of $R^1$, $R^2$, and $R^3$ may be H (thereby forming a tertiary cation moiety at M). In yet other embodiments, two of $R^1$, $R^2$, and $R^3$ may be H (thereby forming a secondary cation moiety at M).

As noted, L may be a suitable linking group, including e.g. a $C_1$ to $C_{20}$ hydrocarbon chain. In particular embodiments, L may have the following structural formula (e.g., it may be a substituted propyl chain, with substitution according to the following structure):

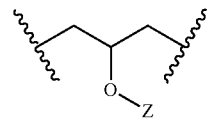

Z may be selected from the group consisting of: H, $R_7(CO)-$, $(CH_2CH_2O)_n$, $(CH_2CH(CH_3)O)_n$, $R_7SO_2^-$, $R_7(SO_2)O-$, $R_7$, and combinations thereof. $R_7$ may be a $C_1$ to $C_{20}$ hydrocarbon chain. Each n may be an integer ranging from 1 to 10.

Furthermore, as also noted, T may be an amine, ammonium, phosphine, or phosphonium. In particular embodiments, T may be selected from the group consisting of compounds having the following structural formulas:

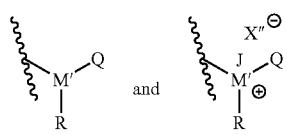

In such embodiments, M' is either phosphorus or nitrogen. R may be any hydrocarbon chain in accordance with discussion of lipophilic tail R above. Where present, J may be any one of: H, a $C_1$ to $C_6$ hydrocarbon chain, and combinations thereof. Where present, X" may independently be any ion that X could be. In each structure of T, Q may be H or an organic group. In particular, in some embodiments Q may be a $C_1$ to $C_{20}$ hydrocarbon chain, or a $C_1$ to $C_{10}$ hydrocarbon chain, or a $C_1$ to $C_6$ hydrocarbon chain. In certain embodiments, Q may be a substituted hydrocarbon chain including an additional amine, ammonium, phosphine, or phosphonium moiety, such as an alkyl, alkenyl, alkynyl, or aryl amine, or an alkyl, alkenyl, alkynyl, or aryl phosphine; or an alkyl, alkenyl, alkynyl, or aryl ammonium moiety, or an alkyl, alkenyl, alkynyl, or aryl phosphonium moiety, or combinations thereof. For instance, Q may have the structure:

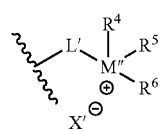

where L' may independently be any structure that L may be, as discussed above; M" may be nitrogen or phosphorus; X' may independently be any anion that X may be, as discussed above; and each of $R^4$, $R^5$, and $R^6$ may independently be H or any hydrocarbon chain according to $R^1$, $R^2$, and $R^3$ discussed above. In particular embodiments, the corrosion-inhibiting compound may be symmetrical about the central amine or phosphine (or, where applicable—such as in the case of salts—around the central ammonium or phosphonium moiety). In such instances, L' is the same as L, and each of $R^4$, $R^5$, and $R^6$ is identical to each of $R^1$, $R^2$, and $R^3$, respectively.

In various embodiments, any one or more of the foregoing R-groups $R^1$ through $R^6$ may be unsubstituted. Likewise, in some embodiments, R may be unsubstituted.

Compounds including multiple hydrophilic heads and one or more lipophilic tails according to the foregoing, and/or their salts, may be surfactants, and/or may have surfactant-like properties. For instance, they may, among other things, concentrate near water-metal interfaces and/or emulsify water into the hydrocarbon phase. They may in some embodiments adhere to a metal or other surface, as discussed previously. They may furthermore wet the surface (e.g., by increasing the hydrophobicity of the surface), thereby chemically preventing acids and other aqueous-phase and/or polar compounds from reaching the metal or other surface. In certain embodiments, they may coat the surface (e.g., forming a film). Compounds coating a metal or other surface may form a physical barrier between a corrosive environment and the metal or other surface.

As previously noted, the present disclosure in some embodiments further provides methods of using compounds according to the present disclosure. In particular embodiments, the compounds may be employed as corrosion inhibitors. Thus, the present disclosure may provide a method of inhibiting corrosion of a metal or other surface. Such surface may, in some embodiments, be a downhole surface (e.g., a metal or other surface within a subterranean formation). In particular embodiments, the surface may be a metal surface of a tool or pipe in a wellbore penetrating at least a portion of a subterranean formation. The method of inhibiting corrosion may include contacting the metal or other surface with the corrosion-inhibiting compound so as to inhibit corrosion of that surface. In some embodiments, the corrosion-inhibiting compound may contact the surface so as to form a coating of the compound on at least a portion of the metal or other surface. The corrosion-inhibiting compound may comprise multiple hydrophilic heads, a lipophilic tail, and one or more linking groups, in accordance with compounds discussed with respect to various embodiments herein.

Some embodiments may include contacting a surface with a composition comprising a corrosion-inhibiting compound as described herein (e.g., a compound that includes multiple hydrophilic heads, a lipophilic tail, and a linking group), and/or a salt of such a compound. The composition may be any suitable composition in which the corrosion-inhibiting compound may be included. For example, in some embodiments, the composition may be a hydrophilic solution comprising a hydrophilic solvent and the corrosion-inhibiting compound. Suitable hydrophilic solvents include any one or more of: water, methanol, isopropyl alcohol, ethylene glycol monobutyl ether (EGMBE), ethylene glycol (EG), acetone, glycerine, ethanol, butanol, polypropylene glycol, other hydrophilic alcohols, other hydrophilic solvents, and combinations thereof. The compound may be included in the solvent in a concentration of from about 2 to about 50 ppm.

In some embodiments, the compound may be included in the solvent in a concentration as little as any of: 2, 3, 4, 5, 6, 7, 8, 9, 10, 11, 12, 13, 14, 15, 16, 17, 18, 19, and 20 ppm. The compound may be included in the solvent in various embodiments in a concentration as much as any of: 5, 6, 7, 8, 9, 10, 11, 12, 13, 14, 15, 16, 17, 18, 19, 20, 21, 22, 23, 24, 25, 26, 27, 28, 29, 30, 35, 40, 45, and 50 ppm. Thus, in particular example embodiments, the compound may be included in hydrophilic solvent in about 5 to about 20 ppm; in about 2 to about 10 ppm; or in about 3 to about 15 ppm.

In some embodiments, the hydrophilic solution may be included in a treatment fluid for use in a wellbore penetrating at least a portion of a subterranean formation during, for instance, oil and/or gas recovery operations. Thus, a corrosion-inhibiting compound of some example embodiments may be an additive to other treatment fluids, and/or corrosion inhibiting compounds of the present disclosure may be introduced in a subterranean formation and/or well bore in conjunction with one or more treatment fluids. Such treatment fluids may comprise any treatment fluid known in the art (e.g., treatment fluids suitable for use in subterranean formations). As used herein, the term "treatment fluid" refers to any fluid that may be used in an application in conjunction with a desired function and/or for a desired purpose. The term "treatment" does not imply any particular action by the fluid or any component thereof. The treatment fluids of the present invention generally comprise a base fluid and, in certain embodiments, comprise one or more acids. Examples of common treatment fluids include, but are not limited to, drilling fluids, spacer fluids, completion fluids, and workover fluids. Treatment fluids of the present disclosure optionally may comprise any number of additional additives in combination with the catechol component and amine component. Other examples of such additional additives include, but are not limited to, weighting agents, surfactants, emulsifiers, acids, fluorides, fluid loss control additives, gas, nitrogen, carbon dioxide, surface modifying agents, tackifying agents, foamers, additional corrosion inhibitors, scale inhibitors, catalysts, clay control agents, biocides, friction reducers, antifoam agents, bridging agents, dispersants, flocculants, additional $H_2S$ scavengers, $CO_2$ scavengers, oxygen scavengers, lubricants, viscosifiers, breakers, relative permeability modifiers, resins, particulate materials (e.g., proppant particulates), wetting agents, coating enhancement agents, filter cake removal agents, and the like. A person skilled in the art, with the benefit of this disclosure, will recognize the types of additives that may be included in the fluids of the present disclosure for a particular application.

Methods according to some embodiments may include allowing the corrosion-inhibiting compound to concentrate at a metal-water interface in the fluid (e.g., an interface between water and gas in the fluid, and/or between water and liquid hydrocarbon), and/or at an interface between a metal or other surface and the fluid. The compound in some embodiments may be introduced such that its concentration in a fluid contacting the metal or other surface is approximately 1 ppm to approximately 100 ppm. In some embodiments, the lower limit of concentration may be any one of about 2, 3, 4, 5, 6, 7, 8, 9, 10, 11, 12, 13, 14, 15, 16, 17, 18, 19, 20, 21, 22, 23, 24, 25, 26, 27, 28, 29, and 30 ppm. An upper limit of concentration may in various embodiments include any one of: 7, 8, 9, 10, 11, 12, 13, 14, 15, 20, 25, 30, 35, 40, 45, 50, 55, 60, 65, 70, 75, 80, 85, 90, 95, and 100 ppm. Thus, for example, in particular embodiments, the compound may be introduced such that its concentration in a fluid contacting the metal or other surface is from about 1 ppm to about 10 ppm; in other embodiments, from about 2 ppm to about 20 ppm; in yet other embodiments, from about 3 ppm to about 8 ppm; in yet other embodiments, from about 3 to about 7 ppm; and in yet other embodiments, from about 4 to about 50 ppm; etc.

The corrosion-inhibiting compounds of the present disclosure may be introduced into a well bore, subterranean formation, tubing, umbilical, flowline, and/or pipeline (topside or downhole) using any method or equipment known in the art. For example, these corrosion-inhibiting compounds may be applied to a subterranean formation and/or well bore using batch treatments, squeeze treatments, continuous treatments, and/or combinations thereof. In certain embodiments, a batch treatment may be performed in a subterranean formation by stopping production from the well and pumping the dissolved corrosion-inhibiting compound into a well bore, which may be performed at one or more points in time during the life of a well. In other embodiments, a squeeze treatment may be performed by dissolving the corrosion inhibiting compound in a suitable solvent at a suitable concentration and squeezing that solvent carrying the compound downhole into the formation, allowing production out of the formation to bring the corrosion inhibiting compound to its desired location. In still other embodiments, a corrosion inhibiting compound of the present disclosure may be injected into a portion of a subterranean formation using an annular space or capillary injection system to continuously introduce the compound into the formation. A corrosion-inhibiting compound could in some embodiments be applied continuously downhole by slip-stream, neat annulus drip, cap strings, umbilical strings, and/or by an injection gas used in a gas lift operation. In certain embodiments, a treatment fluid comprising a corrosion inhibiting compound of the present disclosure may be circulated in the well bore using the same types of pumping systems and equipment at the surface that are used to introduce treatment fluids or additives into a well bore penetrating at least a portion of the subterranean formation. In particular embodiments, a corrosion-inhibiting compound could be dried and formed into a solid for delivery into rat holes, tanks, and/or a wellbore (within the annulus and/or casing).

Figure 4:
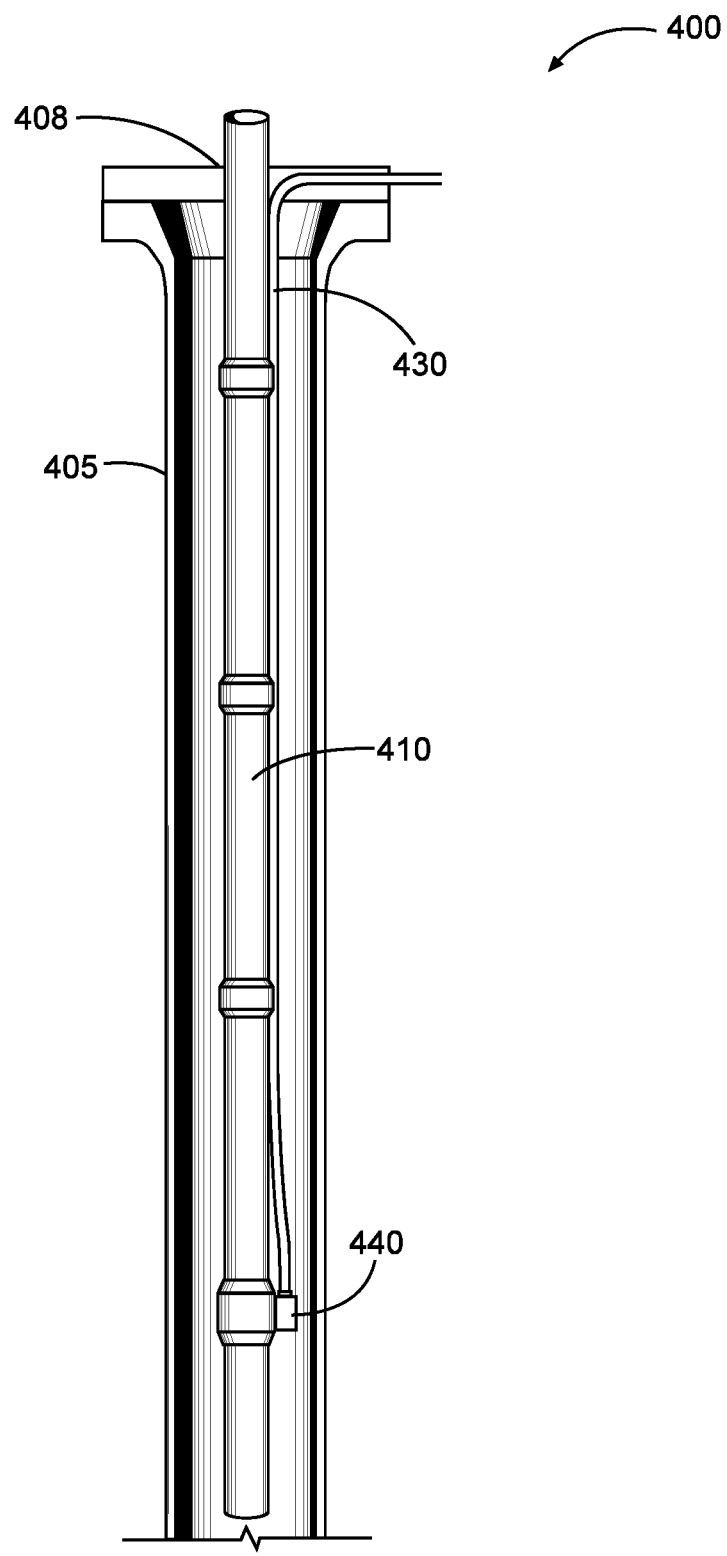
FIG. 4 is a diagram illustrating an injection system that may be used in accordance with certain embodiments of the present disclosure.

For example, a corrosion inhibiting compound of the present disclosure may be introduced into a well bore using a capillary injection system as shown in FIG. 4. Referring now to FIG. 4, well bore 405 has been drilled to penetrate a portion of a subterranean formation 400. A tubing 410 (e.g., production tubing) has been placed in the well bore 405. A capillary injection tube 430 is disposed in the annular space between the outer surface of tubing 410 and the inner wall of well bore 405. The capillary injection tube 430 is connected to a side-pocket mandrel 440 at a lower section of the tubing 410. A corrosion-inhibiting compound may be injected into capillary injection tube 130 at the wellhead 108 at the surface such that it mixes with production fluid at or near the side-pocket mandrel 140. As the production fluid flows through the tubing 110, the corrosion-inhibiting compound may treat the inner surface of the tubing 110. Other capillary injection systems and side pocket mandrel devices (e.g., those used in gas lift production) may be used in a similar manner to the system shown in FIG. 1.

In certain embodiments, a corrosion inhibiting compound of the present disclosure may be added to a pipeline where one or more fluids enter the pipeline and/or at one or more other locations along the length of the pipeline. In these embodiments, the corrosion inhibiting compound may be added in batches or injected substantially continuously while the pipeline is being used.

Once introduced into a treatment fluid, subterranean formation, well bore, pipeline, or other location, the corrosion-inhibiting compound may concentrate at a metal-water interface. They may in some embodiments interact with the metal surface so as to inhibit corrosion of the metal surface. For instance, they may coat the metal surface so as to protect it from corrosion.

For instance, the compound may be introduced into a wellbore penetrating at least a portion of a subterranean formation. Introduction of the compound may in such embodiments include delivery via any of a tube, umbilical, pump, and combinations thereof. A corrosion-inhibiting compound may, in various embodiments, be delivered downhole (e.g., into the wellbore) or into top-side flowlines or pipelines. Such compounds could in some embodiments be applied continuously down-hole by slip-stream, neat annulus drip, cap strings, umbilical strings, and/or into an injection gas used in a gas lift operation. In some embodiments, a corrosion-inhibiting compound may be introduced in batch form (e.g., introduced in batch form downhole via a tubing string or into the annulus defined between a wellbore wall and casing in, e.g., an oil/gas well). In certain embodiments, a corrosion-inhibiting compound could be dried and formed into a solid for delivery into rat holes, tanks, and/or a wellbore (within the annulus and/or casing).

In a first embodiment, the present disclosure may provide a method of inhibiting corrosion, the method comprising: introducing a composition comprising a hydrophilic solvent and a corrosion-inhibiting compound into a wellbore penetrating at least a portion of a subterranean formation; and contacting a metal surface in the wellbore with the corrosion-inhibiting compound, such that the corrosion-inhibiting compound adheres to at least a portion of the metal surface, thereby inhibiting corrosion of the metal surface; wherein the corrosion-inhibiting compound has the structural formula:

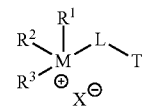

Each of $R^1$, $R^2$, and $R^3$ is independently selected from the group consisting of: hydrogen, a $C_1$ to $C_{20}$ hydrocarbon chain, and combinations thereof; M is selected from the group consisting of nitrogen and phosphorous; X is an anion selected from the group consisting of halide, a Group 6 anion, carboxylate, sulfate, organic sulfonate, hydroxide, and combinations thereof; and L is a $C_1$ to $C_{20}$ hydrocarbon chain. T is selected from the group consisting of compounds having the following structural formulas:

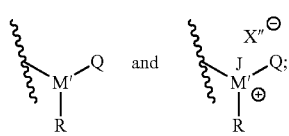

wherein R is a $C_1$ to $C_{20}$ hydrocarbon chain; J is selected from the group consisting of hydrogen, a $C_1$ to $C_6$ hydrocarbon chain, and combinations thereof; X" is an anion selected from the group consisting of halide, a Group 6 anion, carboxylate, sulfate, organic sulfonate, hydroxide, and combinations thereof; M' is selected from the group consisting of nitrogen and phosphorous; and Q is selected from the group consisting of: H, a $C_1$ to $C_{20}$ hydrocarbon chain, alkyl amine, alkenyl amine, alkynyl amine, aryl amine, alkyl phosphine, alkenyl phosphine, alkynyl phosphine, aryl phosphine, alkyl ammonium, alkenyl ammonium, alkynyl ammonium, aryl ammonium, alkyl phosphonium, alkenyl phosphonium, alkynyl phosphonium, aryl phosphonium, and combinations thereof.

A second embodiment may include a method according to the first embodiment, further wherein Q may have the structural formula:

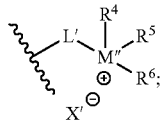

wherein: L' is a $C_1$ to $C_{20}$ hydrocarbon chain; M" is selected from the group consisting of nitrogen and phosphorous; X' is an anion selected from the group consisting of halide, a Group 6 anion, carboxylate, sulfate, organic sulfonate, hydroxide, and combinations thereof; and each of $R^1$, $R^2$, and $R^3$ is independently selected from the group consisting of: hydrogen, a $C_1$ to $C_{20}$ hydrocarbon chain, and combinations thereof.

A third embodiment may include a method according the second embodiment, further wherein each of L and L' independently has the structure:

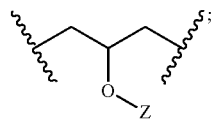

wherein Z of each of L and L' is independently selected from the group consisting of: hydrogen, $R^7(CO)$—, $(CH_2CH_2O)_n$, $(CH_2CH(CH_3)O)_n$, $R^7SO_2^-$, $R^7(SO_2)O$—, $R^7$, and combinations thereof; wherein $R^7$ is a $C_1$ to $C_{20}$ hydrocarbon chain, and further wherein n ranges from 1 to 10.

A fourth embodiment may include a method according to any one of the second and third embodiments, wherein L has the same structure as L'.

A fifth embodiment may include a method according to any one of the foregoing embodiments, wherein the anti-agglomerate compound has the structural formula:

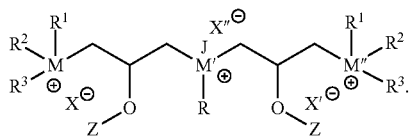

A sixth embodiment may include a method according to any one of the foregoing embodiments, wherein each of $R^1$, $R^2$, and $R^3$ is a $C_1$ to $C_8$ chain, and further wherein R is a $C_8$ to $C_{18}$ hydrocarbon chain.

A seventh embodiment may include a method according to any one of the foregoing embodiments, wherein each of M, M', and M" is nitrogen.

An eighth embodiment may include a method according to any one of the foregoing embodiments, wherein each of $R^1$, $R^2$, and $R^3$ is $CH_2CH_3$.

A ninth embodiment may include a method according to any one of the first through seventh embodiments, wherein each of $R^1$ and $R^2$ is $CH_3$ and $R^3$ is $CH_2CH_3$.

A tenth embodiment may include a method according to any one of the first through seventh embodiments, wherein each of $R^1$ and $R^2$ is $CH_3$ and $R^3$ is benzyl.

An 11th embodiment may include a method according to any one of the first through seventh embodiments, wherein each of $R^1$, $R^2$, and $R^3$ is $CH_2CH_2CH_2CH_3$.

A 12th embodiment may include a method comprising: introducing a composition comprising a hydrophilic solvent and a corrosion-inhibiting compound into a wellbore penetrating at least a portion of a subterranean formation; and contacting a metal surface in the wellbore with the corrosion-inhibiting compound such that the corrosion-inhibiting compound adheres to at least a portion of the metal surface, thereby inhibiting corrosion of the metal surface; wherein the composition comprises a corrosion-inhibiting compound or a salt thereof, the corrosion-inhibiting compound comprising a lipophilic tail, three or more hydrophilic heads for each lipophilic tail of the compound, a first linking group linking a first one and a second one of the hydrophilic heads, and a second linking group linking the second one and a third one of the hydrophilic heads; and wherein at least two of the hydrophilic heads are cationic hydrophilic heads.

A 13th embodiment may include a method according to the 12th embodiment, wherein each cationic hydrophilic head comprises a cation moiety independently selected from the group consisting of: quaternary ammonium cation moiety; tertiary ammonium cation moiety; phosphonium cation moiety; and combinations thereof.

A 14th embodiment may include a method according to any one of the 12th and 13th embodiments, wherein each of at least two of the cationic hydrophilic heads comprises a moiety having the chemical formula $R^1R^2R^3M^+$, wherein each of $R^1$, $R^2$, and $R^3$ is a $C_1$ to $C_8$ hydrocarbon chain independently selected from the group consisting of alkyl, alkenyl, alkynyl, aryl, and combinations thereof; and wherein M is either nitrogen or phosphorous.

A 15th embodiment may include a method according to the 14th embodiment, wherein each of $R^1$ and $R^2$ is $CH_3$, and $R^3$ is benzyl.

A 16th embodiment may include a method according to any one of the 12th-15th embodiments, wherein the corrosion-inhibiting compound comprises the reaction product of a reaction process that comprises (i) a first reaction between a long-chain primary amine and an epihalohydrin, and (ii) a second reaction between the product of the first reaction with an amine selected from the group consisting of secondary amines, tertiary amines, and combinations thereof.

A 17th embodiment may include a method according to any one of the 12th-16th embodiments, wherein the lipophilic tail is a $C_8$ to $C_{18}$ hydrocarbon chain.

An 18th embodiment may include a method according to any one of the 14th-15th embodiments, wherein the lipophilic tail comprises more carbon atoms than each one of $R^1$, $R^2$, and $R^3$.

A 19th embodiment may include a method comprising: contacting a metal surface with a composition comprising a corrosion-inhibiting compound, such that the corrosion-inhibiting compound adheres to at least a portion of the metal surface, thereby inhibiting corrosion of the metal surface; wherein the corrosion-inhibiting compound has the structural formula:

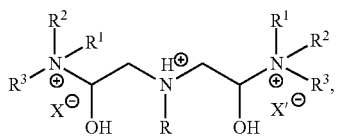

Each of $R^1$, $R^2$, and $R^3$ is independently selected from the group consisting of: hydrogen and a C1 to $C_8$ hydrocarbon chain; each of X and X' is an anion selected from the group consisting of halide, carboxylate, sulfate, organic sulfonate, hydroxide, and combinations thereof; and R is a $C_8$ to $C_{30}$ hydrocarbon chain.

A 20th embodiment may include a method according to the 19th embodiment, wherein each of $R^1$, $R^2$, and $R^3$ is $CH_2CH_3$.

A 21st embodiment may include a method according to the 19th embodiment, wherein each of $R^1$ and $R^2$ is $CH_3$ and $R^3$ is $CH_2CH_3$.

A 22nd embodiment may include a method according to any of the foregoing embodiments, wherein the corrosion-inhibiting compound is present in the composition in an amount ranging from about 2 ppm to about 50 ppm.

A 23rd embodiment may include a method according to the 22nd embodiment, wherein the corrosion-inhibiting compound is present in the composition in an amount ranging from about 5 ppm to about 20 ppm.

A 24th embodiment may include a method according to the 22nd embodiment, wherein the corrosion-inhibiting compound is present in the composition in an amount A 25th embodiment may include a method according to the 22nd embodiment, wherein the corrosion-inhibiting compound is present in the composition in an amount ranging from about 3 ppm to about 7 ppm.

A 26th embodiment may include a method according to any one of the foregoing embodiments, wherein the corrosion-inhibiting compound is present in the composition such that its concentration in fluid at the metal surface ranges from about 2 to about 20 ppm.

A 27th embodiment may include a method according to any one of the 1st through 25th embodiments, wherein the corrosion-inhibiting compound is present in the composition such that its concentration in fluid at the metal surface ranges from about 3 to about 8 ppm.

A 28th embodiment may include a method according to any one of the 1st through 25th embodiments, wherein the corrosion-inhibiting compound is present in the composition such that its concentration in fluid at the metal surface ranges from about 4 to about 50 ppm.

A 29th embodiment may include a method comprising introducing a composition comprising a hydrophilic solvent and a corrosion-inhibiting compound into a pipeline; and contacting a metal surface in the pipeline with the corrosion-inhibiting compound. The corrosion-inhibiting compound has the structural formula:

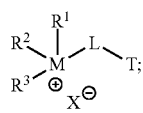

wherein each of $R^1$, $R^2$, and $R^3$ is independently selected from the group consisting of: hydrogen, a $C_1$ to $C_{20}$ hydrocarbon chain, and combinations thereof; wherein M is selected from the group consisting of nitrogen and phosphorous; wherein X is an anion selected from the group consisting of halide, carboxylate, sulfate, organic sulfonate, hydroxide, and combinations thereof; wherein L is a $C_1$ to $C_{20}$ hydrocarbon chain; and wherein T is selected from the group consisting of compounds having the following structural formulas:

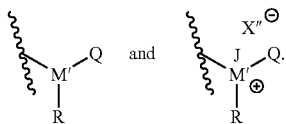

R is a $C_1$ to $C_{30}$ hydrocarbon chain; J is selected from the group consisting of hydrogen, a $C_1$ to $C_6$ hydrocarbon chain, and combinations thereof; X" is an anion selected from the group consisting of halide, carboxylate, sulfate, organic sulfonate, hydroxide, and combinations thereof; M' is selected from the group consisting of nitrogen and phosphorous; and Q is selected from the group consisting of: H, a $C_1$ to $C_{20}$ hydrocarbon chain, alkyl amine, alkenyl amine, alkynyl amine, aryl amine, alkyl phosphine, alkenyl phosphine, alkynyl phosphine, aryl phosphine, alkyl ammonium, alkenyl ammonium, alkynyl ammonium, aryl ammonium, alkyl phosphonium, alkenyl phosphonium, alkynyl phosphonium, aryl phosphonium, and combinations thereof.

A 30th embodiment may include a method according to the 29th embodiment wherein each of $R^1$, $R^2$, and $R^3$ is $CH_2CH_3$.

A 31st embodiment may include a method according to the 29th embodiment wherein each of $R^1$ and $R^2$ is $CH_3$ and $R^3$ is $CH_2CH_3$.

A 32nd embodiment may include a method according to the 29th embodiment wherein each of $R^1$ and $R^2$ is $CH_3$ and $R^3$ is a benzyl group.

To facilitate a better understanding of the present disclosure, the following examples of some of the exemplary embodiments are given. In no way should such examples be read to limit the scope of the invention.

Example 1

A series of corrosion-inhibiting compounds according to the present disclosure were prepared. In this instance, each prepared compound comprised a multi-quat (except Sample 112-91I, which instead comprised tertiary ammonium cations). Each compound prepared had a structure according to molecule 520 as shown in FIG. 3. R ranged from $C_{12}$ to $C_{16}$ within any given sample. $R^1$, $R^2$, and $R^3$ had various identities for each sample in accordance with Table 1 below.

TABLE 1

Structures of Sample Corrosion Inhibitors

| Sample ID | $R^1$ | $R^2$ | $R^3$ |
|---|---|---|---|
| 112-91A | $C_1$ | $C_1$ | $C_2$ |
| 112-91B | n-$C_4$ | n-$C_4$ | n-$C_4$ |
| 112-91C | n-$C_3$ | n-$C_3$ | n-$C_3$ |
| 112-91D | $C_1$ | $C_1$ | n-$C_4$ |
| 112-91E | $C_2$ | $C_2$ | $C_2$ |
| 112-91F | $C_1$ | $C_1$ | iso-$C_3$ |
| 112-91G | $C_1$ | $C_1$ | Benzyl |
| 112-91H | $C_2$ | $C_2$ | Benzyl |
| 112-91I | H | n-$C_3$ | n-$C_3$ |

Kettle testing was performed over a duration of 24 hours on each sample at 150° F., with moderate stirring via magnetic stir bar/plate combination, and continuous $CO_2$ purge. After an approximate 3-hour baseline phase, each sample was introduced at 50 ppm (concentration of compound based on aqueous phase) into a 90%/10% mixture of sea salt and LVT-200 oil, and allowed to remain in the mixture for the remaining approximately 21 hours of the test. Each sample comprising corrosion-inhibiting compound in this test was approximately 75% active, meaning about 37.5 ppm of corrosion-inhibiting compound (on basis of aqueous phase) was present in the mixture.

Figure 5:
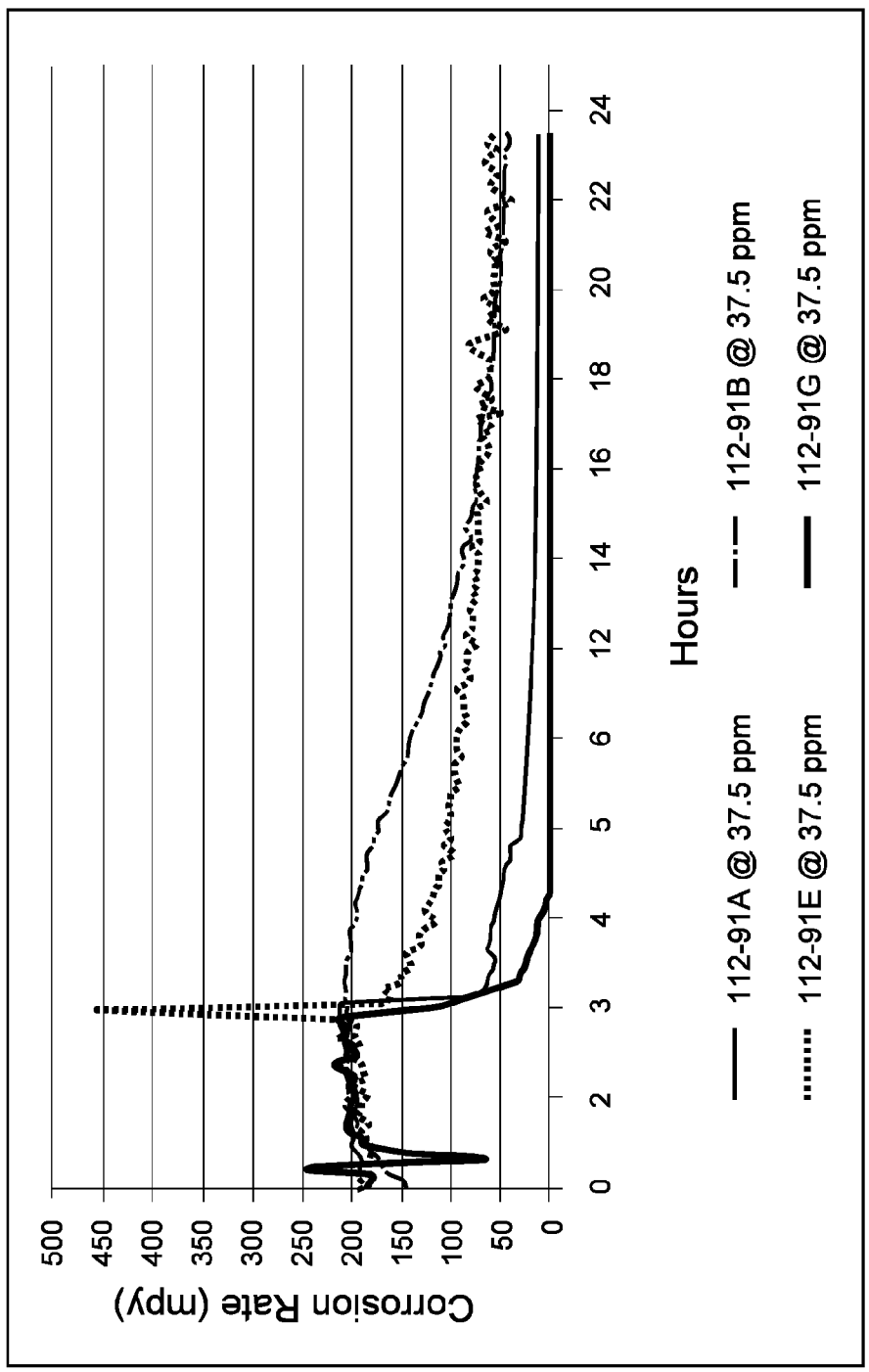
FIG. 5 is a graph illustrating performance in kettle testing of various sample compounds in accordance with the present disclosure.

As shown in FIG. 5, Sample 112-91G maintained the relatively lowest overall corrosion rate, as well as by exhibiting the most rapid reduction in corrosion rate to 0 mpy (mils per year).

Example 2

Figure 6:
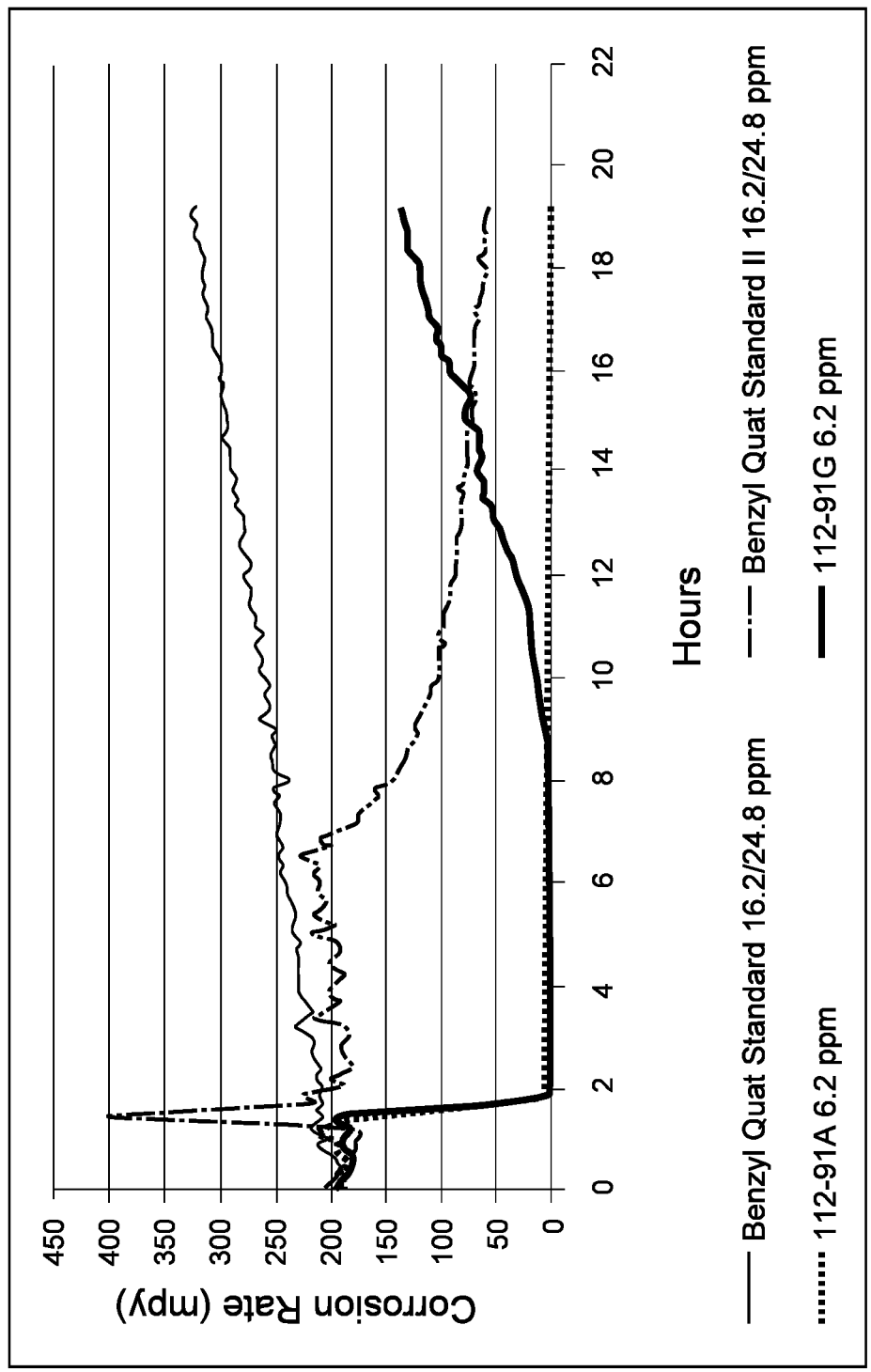
FIG. 6 is a graph illustrating performance in kettle testing of various sample compounds in accordance with the present disclosure as compared to some commercially available corrosion inhibitors.

Samples 112-91G and 112-91A from Example 1 were chosen to run a second set of testing together with two commercially available products, each comprising a benzyl quaternary compound (sometimes referred to as a benzyl-quat and/or coco-quat): "Benzyl Quat Standard I" and "Quat Standard II". Samples 112-91G and 112-91A were employed in kettle testing according to the parameters of Example 1, excepting that each sample was present at 6.2 ppm active product (that is, corrosion-inhibiting compound) on basis of aqueous phase, rather than 37.5 ppm as in Example 1. Also, each sample was added at the 1.41 hour mark rather than the approximately 3 hour mark. Benzyl Quat Standard I and Benzyl Quat Standard II were similarly added at 6.2 ppm active on basis of aqueous phase at the 1.41 hour mark. However, a second injection of each standard was made at the 7 hour mark during the test, bringing the concentration of each standard up to 24.8 ppm active on aqueous phase basis. As shown in FIG. 6, even with the addition of extra standards, Samples 112-91A and 112-91G provided more corrosion inhibition than both commercial products either in all cases or on average.

Example 3

Figure 7:
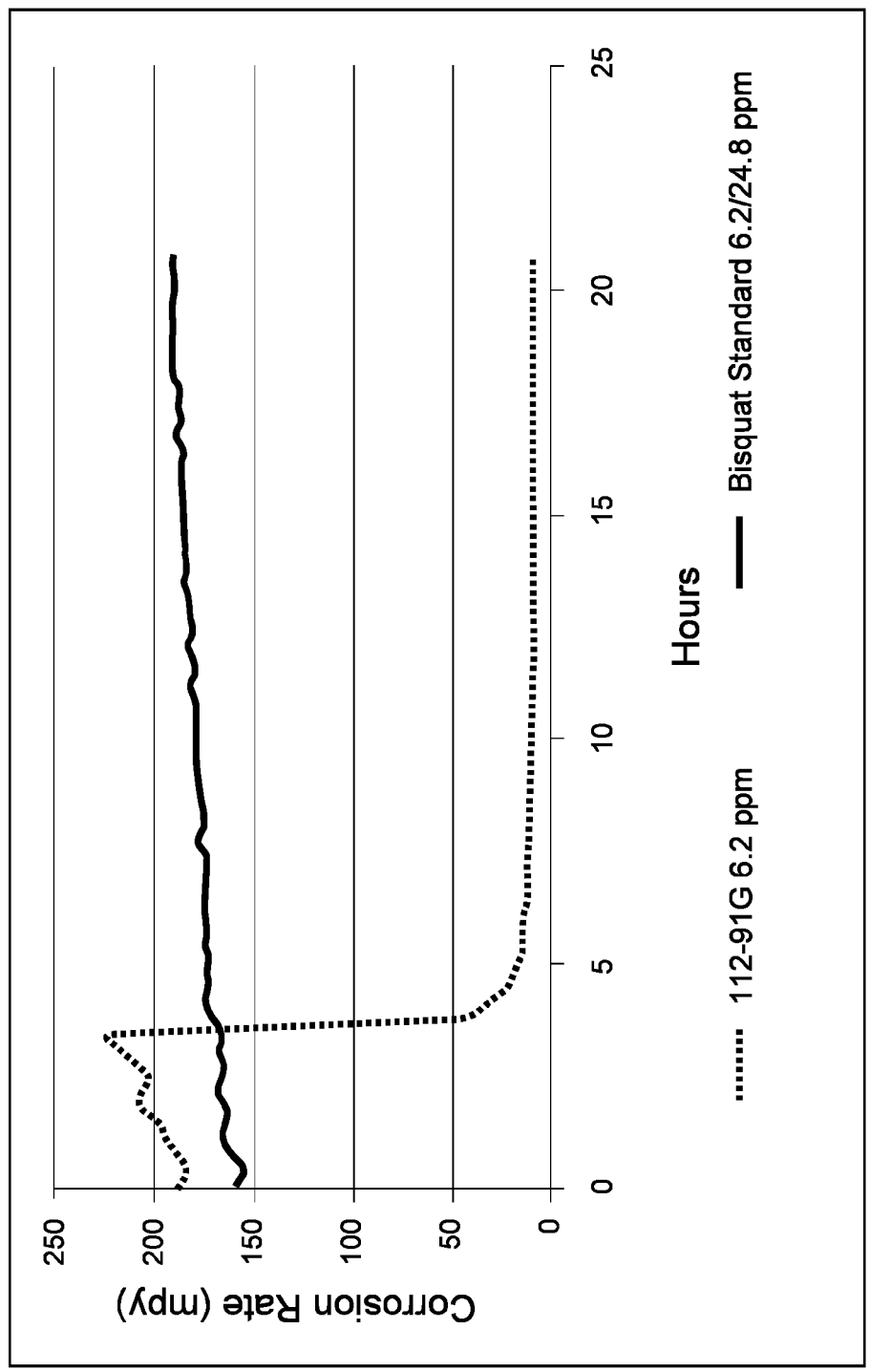
FIG. 7 is a graph illustrating performance in kettle testing of a sample compounds in accordance with the present disclosure as compared to a commercial corrosion inhibitor.

Sample 112-91G was likewise compared to a commercially-available bis-quat corrosion inhibitor ("Bisquat Standard") comprising a bis-quat compound. Each of Sample 112-91G and the Bisquat Standard was added (6.2 ppm active corrosion inhibitor on aqueous phase basis) at the 3.44 hour mark in each respective test to the same mixture and under the same conditions as with Example 2. Once again, additional commercial product was added at the 7 hour mark, bringing the concentration of Bisquat Standard up to 12.4 ppm active. As shown in FIG. 7, Sample 112-91G provided enhanced corrosion inhibition, notwithstanding the addition of extra Bisquat Standard.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of inhibiting corrosion, the method comprising:
   introducing a composition comprising a hydrophilic solvent and a corrosion-inhibiting compound into a wellbore penetrating at least a portion of a subterranean formation; and
   contacting a metal surface in the wellbore with the corrosion-inhibiting compound;
   wherein the corrosion-inhibiting compound has the structural formula:

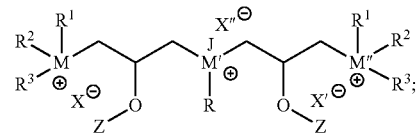

wherein each of $R^1$ and $R^2$ is $CH_3$ and $R^3$ is benzyl;
   wherein each of M, M', and M" is nitrogen;
   wherein R is a $C_1$ to $C_{30}$ hydrocarbon chain;
   wherein J is selected from the group consisting of hydrogen, a $C_1$ to $C_6$ hydrocarbon chain, and combinations thereof; and
   wherein each of X, X', and X" is an anion selected from the group consisting of halide, carboxylate, sulfate, organic sulfonate, hydroxide, and combinations thereof.

2. The method of claim 1 further comprising increasing the hydrophobicity of the metal surface.

3. The method of claim 1 wherein the corrosion-inhibiting compound is present in a concentration of from 1 ppm to 100 ppm.

4. The method of claim 1 wherein the corrosion-inhibiting compound comprises the reaction product of a reaction process that comprises (i) a first reaction between a long-chain primary amine and an epihalohydrin, and (ii) a second reaction between the product of the first reaction with an amine selected from the group consisting of a secondary amine, a tertiary amine, and any combination thereof.

5. The method of claim 4 wherein the reaction process occurs at a temperature in a range of from 20° C. to 80° C.

6. The method of claim 1 wherein J is hydrogen.

7. The method of claim 1 wherein J is a $C_1$ to $C_6$ hydrocarbon chain.

8. The method of claim 1 wherein X is a halide.

9. The method of claim 1 wherein X" is a halide.

* * * * *